March 30, 1971 R. A. SIEGEL ET AL 3,573,123
COMPOSITE HIGH TEMPERATURE RESISTANT
MATERIAL AND METHOD OF FABRICATION
Filed May 11, 1966 2 Sheets-Sheet 1

ROBERT A. SIEGEL
JOHN L. JENNINGS
*INVENTOR.*

BY *Steven F. Stone*
ATTORNEY

March 30, 1971 R. A. SIEGEL ET AL 3,573,123
COMPOSITE HIGH TEMPERATURE RESISTANT
MATERIAL AND METHOD OF FABRICATION
Filed May 11, 1966 2 Sheets-Sheet 2

ROBERT A. SIEGEL
JOHN L. JENNINGS
*INVENTOR.*

BY
ATTORNEY

United States Patent Office 3,573,123
Patented Mar. 30, 1971

3,573,123
COMPOSITE HIGH TEMPERATURE RESISTANT MATERIAL AND METHOD OF FABRICATION
Robert A. Siegel, Los Gatos, and John L. Jennings, Cupertino, Calif., assignors to United Aircraft Corporation, East Hartford, Conn.
Filed May 11, 1966, Ser. No. 549,334
Int. Cl. B32b 7/02; B65h 81/04; F16l 9/16
U.S. Cl. 156—171                                      5 Claims

ABSTRACT OF THE DISCLOSURE

A composite heat resistant element is formed by winding composite tapes about a mandrel, each tape having discrete portions of carbon and silica. To resist delamination of the body at the interface between the carbon and silica, the interface is interlocked within a zone within the body rather than along a continuous line.

BACKGROUND OF THE INVENTION

This invention relates to composite high temperature resistant materials and more particularly to an integral high temperature heat resistant material comprising portions of dissimilar materials having an interlocking interface.

High temperature resistant materials are required in many situations of which the fabrication of rocket engine combustion chambers or nozzles and the fabrication of heat shields for re-entry vehicles are exemplary. Since, in such applications, the temperature resistant material must also resist extremely large forces, conventional refractory and ablative materials have been unsatisfactory. To overcome this problem, new materials such as high strength carbon and graphite filaments which maintain their strength at high temperature have been developed. As can be seen from U.S. Patents 3,095,156; 3,111,442; 3,115,988; and 3,140,968; it is known to form tapes of woven silica fibers, impregnate these tapes with a resin and form combustion chambers and heat shields from the impregnated tape by winding on a suitable mandrel. The structures thus formed are quite satisfactory at temperatures up to about 5700° F.; however, at higher temperatures, the silica fibers lose their strength and cannot be used. Also, in certain chemical environments such as in the combustion chamber of an $F_2$—$N_2H_4$ rocket motor, silica cannot be used not only because of the higher temperature environment, but also because the fluorine reacts with the silica.

When extreme temperature or chemical environments exist, high strength carbon or graphite fibers or tapes or cloths are employed. While the carbonaceous materials maintain their resistance to total thermal degradation at temperatures up to about 6600° F. (sublimation point of carbon), the thermal conductivity of a carbonaceous base composite body is substantially greater than that of a comparable silica base body, therefore requiring substantially more material to produce a comparable insulating effect. Since the carbonaceous filaments and cloths are more expensive than the silica materials and the excess weight is undesirable in aerospace applications, it has been proposed to form a composite body having discrete areas of carbonaceous and siliceous material. In such bodies, the carbonaceous material is exposed to the heat and chemical environment, providing strength in the extreme environment, and the siliceous material in the milder environment providing insulation.

Such bodies can be formed by overwrapping a carbonaceous body with the siliceous material or by forming two separate structures which are then bonded together. Regardless of the specific fabrication approach, the bodies possess a sharp continuous interface between the dissimilar materials. When this interface is subjected to temperatures above about 900° F., the resinous bond fractures at the interface of the dissimilar materials and catastrophic failure of the body can occur.

DESCRIPTION OF THE INVENTION

According to this invention, however, an integral composite high temperature heat resistant structure of dissimilar materials is provided having an interlocking interface between the dissimilar materials. The structures of this invention are capable of withstanding substantially higher temperatures than existing composite structures of dissimilar materials.

It is accordingly an object of this invention to provide a composite heat resistant structure of dissimilar materials having an interlocking interface.

It is another object of this invention to provide a unitary heat resistant combustion chamber of dissimilar materials having an interlocking interface.

It is another object of this invention to provide a heat shield for a re-entry vehicle comprising a heat resistant structure of dissimilar materials having an interlocking interface.

It is another object of this invention to provide processes for manufacturing composite high temperature heat resistant structures of dissimilar materials having an interlocking interface.

These and other objects of this invention will be readily apparent from the following description of this invention with reference to the accompanying drawings wherein.

Figure 1:
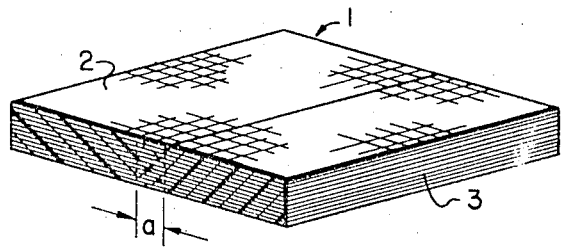
FIG. 1 is a perspective representation in transverse section of a composite body according to this invention.
Figure 2:
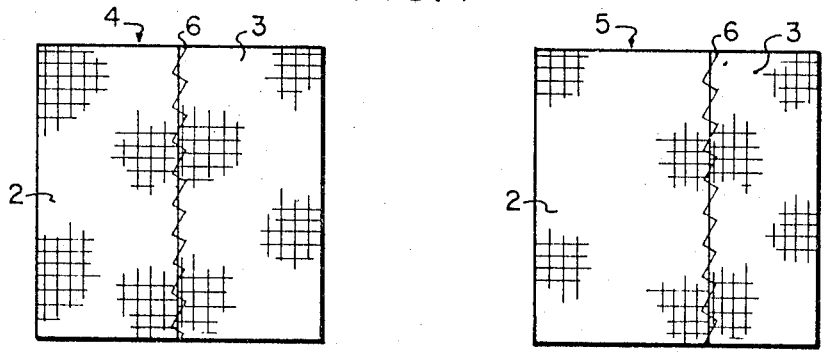
FIG. 2 is a plan view of elements used to form the body of FIG. 1.

Referring now to FIGS. 1 and 2, a composite body comprising dissimilar materials 2 and 3 is shown. For the purpose of illustration, the dissimilar materials will be described as silica 2 and carbon 3, but it is recognized that any high temperature heat resistant dissimilar materials can be employed in various combinations according to this invention, suitable materals including but not being limited to silica; glass; asbestos; carbon; graphite; metals and metalloids (for example, tungsten, boron, and compounds such as boron nitride); which materials can be provided in filaments, sheet, or woven fabric form.

The composite body 1 is preferably fabricated from successive lamina of composite sheets 4 and 5 of dissimilar materials 2 and 3. Sheets 4 and 5 are composed of, for example, woven sheets of resin impregnated silica cloth 2 and high strength carbon or graphite cloth 3, butt spliced together by stitches 6. Various resin systems can be used for impregnation of the sheets, typical systems being phenolic or epoxy resin. With phenolic resin, the cloth is preferably impregnated with a resitolor B stage resin system. It should be noted that stitches 6 do not add materially to the properties of the finished product and are employed mainly to facilitate ease of handling and orientation. Other means of fastening the sheets together such as heat pressing or interweaving of the two fabrics can be employed or the composite can be formed by laying up the dissimilar materials 2 and 3 in abutting relationship.

Sheets 4 and 5 are of the same total width, however, the width of the materials 2 and 3 are unequal in each sheet. When successive laminas of alternate sheets 4 and 5 are superposed, compressed, and heated to completely cure the resin to the resite or the C stage, a body having the interlocking interfacial arrangement of FIG. 1 is produced. Such bodies can be built up to any desired size, machined to shape, and utilized, for example, as the ablative heat shield of a re-entry vehicle.

Figure 3:
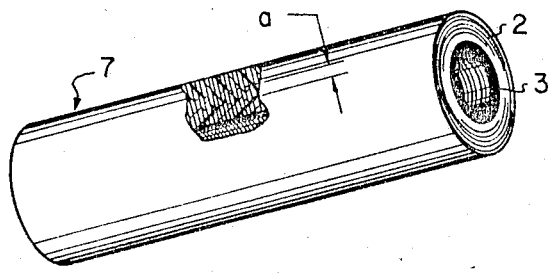
FIG. 3 is a perspective representation partly broken away in longitudinal section of another embodiment of composite body according to this invention.
Figure 4:
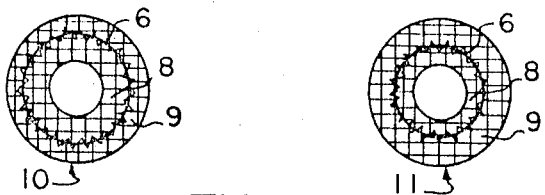
FIG. 4 is a plan view of elements used to form the body of FIG. 3.

Bodies of various configurations having an interlocking interface can be fabricated by this technique. For example, referring to FIGS. 3 and 4, it is possible to fabricate a hollow member 7 of dissimilar materials 2 and 3 suitable for use as a combustion chamber. Such a body can be formed by superposing alternate circular lamina 10 and 11 composed of concentric rings 8 and 9 cut from sheets of resin impregnated cloth of dissimilar materials 2 and 3. The concentric rings 8 and 9 are of differing size in sheets 10 and 11 and may be held together for ease of handling by stitches 6. Since the rings 8 and 9 have been cut from a cloth fabric having a particular warp and woof orientation, it is preferable to annularly displace successive layers to provide more uniform properties in the finished article. The lamina 10 and 11 are successively built up in a suitable cylindrical mold to maintain proper alignment, compressed and treated as described above to produce a structure having the interlocking interface as shown in FIG. 3. The finished structure can be machined to final tolerances, a propellant injector mounted on one end to form a combustion chamber capable of withstanding high temperature fluorine environments. It is recognized that the structure can be reinforced, for example, by the addition of radially disposed filaments of a suitable material between the lamina and/or by the winding and bonding of filaments such as fiberglass around the circumference of the chamber.

In the fabrication of bodies of revolution such as combustion chambers, it is preferred to employ the continuous process which is described below to provide superior physical properties and to eliminate the waste encountered in cutting rings 8 and 9 from cloth.

Figure 5:
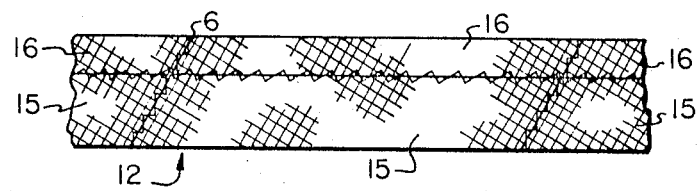
FIG. 5 is a plan view of elements employed in a continuous fabrication process according to this invention and FIG. 6 is a schematic view partly in longitudinal section illustrating the continuous fabrication of composite bodies according to this invention.
Figure 5:
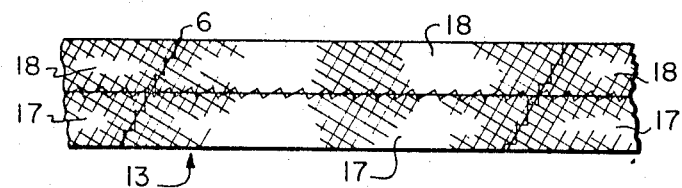
Figure 6:
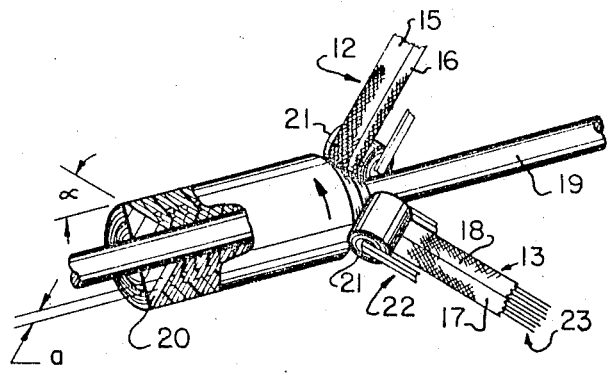

Referring now to FIGS. 5 and 6, composite continuous tapes 12 and 13 are prepared, preferably by stitching together strips 15 and 16 of dissimilar materials to form tape 12 and strips 17 and 18 of the same dissimilar materials respectively to form tape 13.

The overall width of tape 12 is the same as that of tape 13, but the width of the strips 15 and 16 are different from the width of strips 17 and 18 respectively. The individual strips are preferably bias cut relative to the weave from sheets of resin impregnated woven fabric. As shown, the bias angle of the dissimilar materials is the same, but it is recognized that the bias angles of the dissimilar materials can be different in order to permit more or less distortion of the tape without tearing during the wrapping process. As was noted above, the stitches used to splice the tape together do not add to the structural strength of the body formed, but are used primarily to facilitate the handling of the tape and maintenance of proper orientation.

Accordingly, other means of fastening the strips together can be employed or the strip could be maintained in side by side and abutting relationship without physical connection. A tape of dissimilar materials as used herein, therefore, refers to a longitudinally extending band having transverse portions of dissimilar materials maintained in side by side relationship either by physical connection or by positioning means of any sort.

FIG. 6 illustrates the method of fabricating a body of revolution formed of dissimilar materials having an interlocking interface, the apparatus being shown schematically to the extent necessary for a proper understanding of the invention. A removable mandrel 19 having an external surface approximating the desired internal surface of the body and having a conical starting portion 20 with starting angle α is mounted for rotation, as shown by the arrow, in a suitable support, not shown. Resin impregnated tapes 12 and 13 are fed from supply reels, not shown, onto the conical starting portion 20 under debulking rollers 21 at circumferentially spaced stations. The supply reels and debulking rollers are mounted on a motor driven carriage capable of traversing the length of the mandrel. The debulking rollers are connected by support arms 22 to a controllable pressure source, not shown, which applies pressure to the tape as it is applied to the mandrel. The tapes 12 and 13 are heated to a temperature sufficient to soften the resin and to cause the tape to adhere to the preceding layer, for example, by blowing hot air between the tape and the part being formed immediately prior to compression by debulking rollers 21, so that the contact pressure applied by the rollers not only debulks the tapes to a substantially uniform density but also unifies the structure. The debulked heated zone is immediately cooled to maintain full density and prevent spring back of the part being formed. The wrapping process is continued until a body of the desired length is produced. If desired, additional strength can be imparted to the structure by simultaneously winding high strength filaments 23 which can be, for example, high strength carbon or graphite filaments or yarn. Aside from imparting increased hoop strength to the finished article, the filaments when applied under tension tend to assist in the maintenance of the proper orientation of the bands along the mandrel. If desired, filaments can be wound into the structure from both feeding stations rather than from the one station as shown.

The structure is built up as described to the desired length. The structure is then completely cured with heat and pressure and allowed to cool. The part is then removed from the mandrel and the starting portion can be machined off to produce a structure suitable for use as a combustion chamber.

The thickness of the interlocking interface can be varied within wide limits depending on the nature of the article to be fabricated and its intended use. It is readily apparent that some improvement in the properties of the composite will be obtained with even a small thickness of the interlocking interface as opposed to a structure having no interlocking interface. However, in practice, it has been found desirable to have the interlocking zone extend for at least ¼" as is shown by the letter $a$ in FIGS. 1, 3, and 6.

In FIGS. 1 and 3, the structures were produced such that the individual lamina are located in planes parallel to the direction of anticipated heat flux. However, in FIG. 6, the anticipated heat flux will be radial and the individual laminas are inclined with respect to the anticipated heat flux. This improves both the strength and thermal properties of the body by eliminating any continuous planar structure parallel to the direction of heat flux thereby reducing any tendency towards delamination and decreasing the thermal conductivity across the interface in a direction parallel to the anticipated heat flux.

The particular conditions of temperature and pressure employed to produce the composite bodies of this invention will, of course, depend on the particular resin system used and can be determined from a knowledge of their properties by workers in the art. In general, for phenolic systems, it is desirable to heat the tape and filaments to fluidize the resin immediately prior to compression by the debulking heads. Depending upon the coolant medium employed in the subsequent cooling step, temperatures from 200° F. to 500° F. can be utilized. The body being generated should be maintained at a temperature below 125° F. and, preferably, below about 100° F. This cooling is accomplished by blowing cool air or $CO_2$, for example, over the debulked surface. A debulking pressure of between 800 and 1000 p.s.i. applied to the surface of the part being formed has been found to produce uniform compaction of the body being generated.

The final complete cure of the body is preferably a pressure cure at pressures of from 1000 to 4000 p.s.i. and temperatures of from 295° F. to 325° F. for from 3 to 8 hours.

When the non-continuous process of FIGS. 1 and 3 is used, each successive lamina or groups of successive laminas may be compressed in building up the body followed by a complete cure when the body is built up to the desired size. However, satisfactory bodies can be produced merely by laying up the successive layers and then completely curing the entire structure under the temperatures and pressures described above.

The above description of various processes for producing composite bodies having an interlocking interface is illustrative of the various processes and should not be construed as limiting thereof. Various modifications in the process are contemplated. For example, whereas FIG. 6 illustrates the use of two tapes and debulking heads, it is readily apparent that a greater number of tapes and associated debulking heads can also be employed. Also, more than one tape can be simultaneously fed onto the mandrel under one debulking head. Further, in some applications, it may be desirable to generate the body by rotating the tape feeding station around a stationary or contra-rotating mandrel rather than by wrapping on a rotating mandrel from non-rotating tape feed stations as illustrated.

The properties of the finished body are maximized when the interface between the dissimilar materials is displaced in each successive lamina. However, it should be recognized that a body having an interlocking interface can also be produced in which the interfaces in two or more adjacent laminas are aligned as long as there are included in the body a plurality of laminas in which the interface is displaced with respect to at least one adjacent lamina. Although the physical properties of such a body may not be as good as is obtained by displacing the interface in each successive layer, the properties will be better than exhibited by a body having no interlocking interface.

Bodies having more than two discrete areas of dissimilar materials can also be fabricated according to this invention by inclusion of additional material in each lamina and by orienting the additional interface as described herein.

EXAMPLE

A conical combustion chamber 21.5" long having a wall approximately 2" thick with an internal diameter varying from about 10.085" to about 7.44" was fabricated according to the above described continuous process. Two composite tapes 6" wide were prepared from 45° bias cut silica and carbon cloth impregnated with a phenolic resin in the B stage. One tape was composed of a band of silica cloth 4⅛" wide and a band of carbon cloth 1⅞" wide and the other tape was composed of silica cloth 3½" wide and carbon cloth 2½" wide. The mandrel was provided with a starting section inclined at about 30° to the axis of the mandrel. The tapes were applied to the mandrel from stations approximately 180° apart and, in addition, eighteen ¼" bands each band comprising 14 duplex carbon yarn filaments were wound into the body simultaneously from one of the stations. The debulking head applied approximately 800 p.s.i. normal to the surface being built up. The tapes and filaments were heated to about 250° F. immediately prior to entering the debulking zone and cool air was blown on the debulked surface between the debulking heads to maintain the body being generated at a temperature of below 125° F. Tape wrapping was continued until the desired chamber length was reached. The body was completely cured under approximately 3000 p.s.i. at 315° F. for approximately three hours. The body was cooled to ambient and the mandrel removed. The body was then machined to design size and configuration. The interface had an overlap of about .6" with the thickness of the interface in a direction parallel to the anticipated heat flux being about .3". An injector was mounted in the large end of the combustion chamber. The chamber so produced was fired with an $F_2$—$N_2H_4$ propellant combination system for 200 seconds. The body maintained its structural integrity and exhibited no noticeable erosion in the throat.

While this invention has been described with respect to certain embodiments thereof, it should not be construed as being limited thereto. Various modifications and substitutions can be made without departing from the scope of the invention which is limited only by the following claims wherein we claim:

1. A longitudinally extending tape of intermediate length substantially greater than the width thereof and of a thickness substantially smaller than both said length and width, having first and second discrete portions formed respectively of first and second dissimilar high temperature resistant materials, said first and second portions individually being of substantially the same thickness as said tape and being oriented in substantially the same plane, and means maintaining a boundary of said first material portion in non-overlapping, adjacent, and coextensive relationship with a boundary of said second material portion, said boundaries extending longitudinally along said tape coextensively with the length thereof and parallel to the edges of said tape.

2. The composite tape of claim 1 wherein said first discrete portion is formed from a silica fabric impregnated with a curable resin and said second discrete portion is formed from a carbon fabric impregnated with a curable resin.

3. A process for producing a composite high temperature resistant body of dissimilar materials having an interlocking interface comprising the steps of providing at least two resin impregnated tapes of dissimilar materials according to claim 1, said tapes having approximately the same total width, each tape comprising longitudinally coextensive portions of dissimilar materials, the relative widths of the dissimilar portions in one tape being disproportionate with respect to the relative widths of the dissimilar materials in another tape; simultaneously and continuously applying said tapes in superposed relationship about a mandrel with the planes of the tapes being inclined with respect to the axis of said mandrel until a body of predetermined size is generated; compressing said tapes upon application of said tapes to the mandrel; and curing said resin.

4. The process of claim 3 further comprising the step of simultaneously applying a filamentary reinforcing material about said mandrel with said tapes.

5. The process of claim 4 further comprising the steps of heating the tapes to soften said resin prior to application about said mandrel and cooling the body being generated to maintain compacted density.

References Cited

UNITED STATES PATENTS

| 2,059,792 | 11/1936 | Hill | 156—93 |
| 3,095,156 | 6/1963 | Warnken | 156—184X |
| 3,111,442 | 11/1963 | Voisin | 156—192 |

(Other references on following page)

References Cited

| | | | |
|---|---|---|---|
| 3,115,988 | 12/1963 | Warnken | 161—47X |
| 3,135,297 | 6/1964 | Nordberg et al. | 161—55X |
| 3,140,968 | 7/1964 | Barrios et al. | 156—192 |
| 3,142,960 | 8/1964 | Bluck | 161—58UX |
| 3,203,849 | 8/1965 | Katz et al. | 161—96 |
| 2,319,534 | 5/1943 | Crowley | 161—38 |
| 2,554,548 | 5/1951 | Albagnag | 161—36X |
| 3,351,484 | 11/1967 | Gutzeit | 117—46CC |
| 3,425,454 | 2/1969 | Eakins et al. | 138—141 |
| 3,436,292 | 4/1969 | Hatch et al. | 138—141X |

ROBERT F. BURNETT, Primary Examiner

W. W. SCHWARZE, Assistant Examiner

U.S. Cl. X.R.

60—271; 138—141; 156—190, 192, 322; 161—36, 78, 92, 98, 143, 166; 220—3